UNITED STATES PATENT OFFICE.

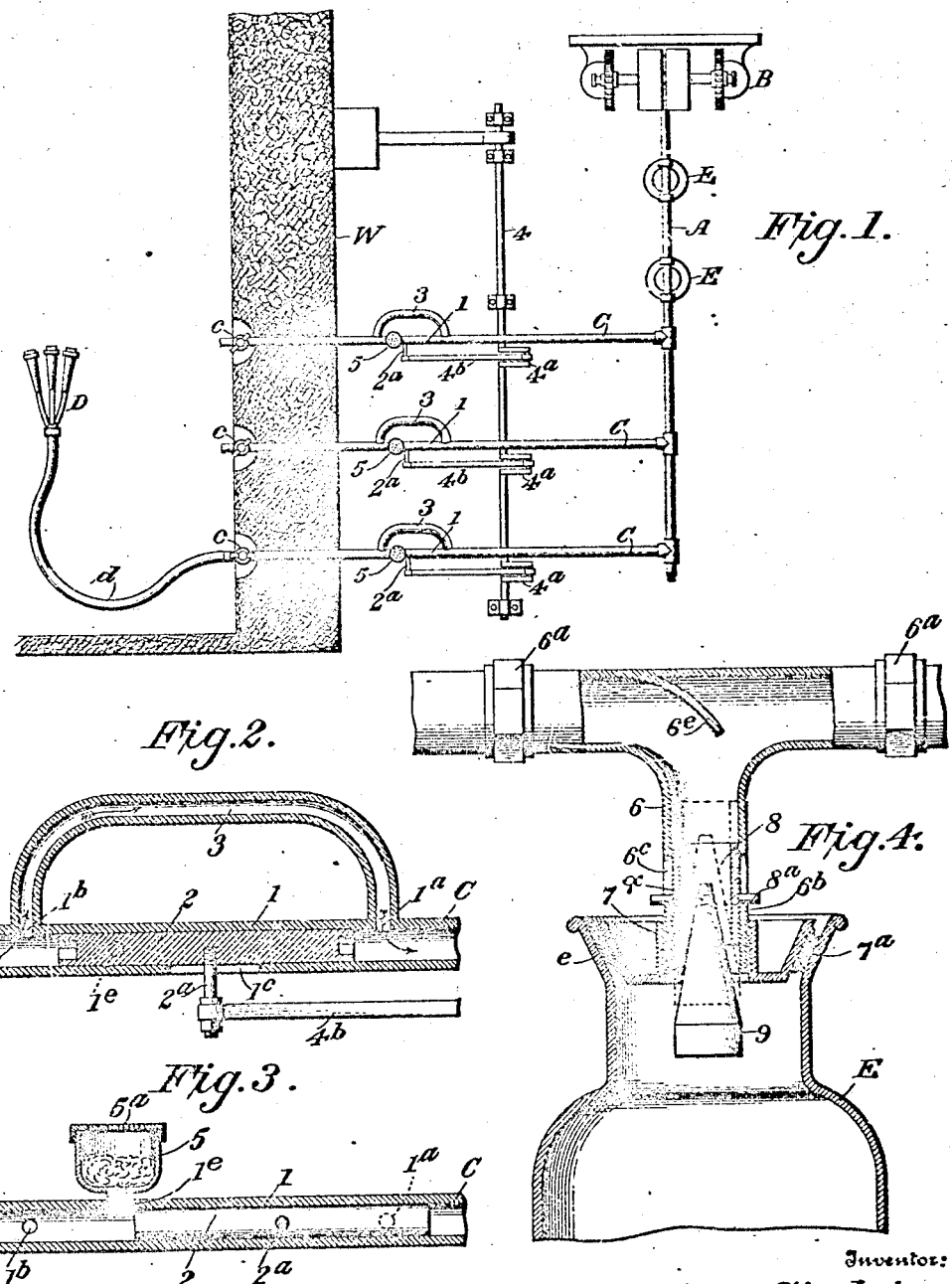

WILLIAM SINCLAIR, OF SAN ANTONIO, TEXAS.

MILKING APPARATUS.

No. 895,208.      Specification of Letters Patent.      Patented Aug. 4, 1908.

Application filed September 17, 1907. Serial No. 393,360.

*To all whom it may concern:*

Be it known that I, WILLIAM SINCLAIR, of San Antonio, in the county of Bexar and State of Texas, have invented certain new and useful Improvements in Milking Apparatus; and I hereby declare that the following is a full, clear, and exact description thereof, reference being had to the accompanying drawings, which form part of this specification.

This invention is an improvement in milking apparatus and its object is to produce a more perfect imitation of hand milking, or of the calf's sucking so that there will be less liability of injury to the cows teats; and to simplify the construction of such apparatus, and to enable milk to be discharged directly into the ordinary transporting cans if desired.

The invention comprises (1) novel suction controlling device or "suction intermitter" as I shall term it for regulating the action of each set of teat-cups or milking devices; and (2) a novel device for connecting the main suction pipe to the receiving cans, so that the milk can be discharged thereinto without loss of vacuum.

I will now describe the invention as illustrated in the accompanying drawings and refer to the claims for summaries of the parts for which protection is desired.

In said drawings: Figure 1 is a diagrammatical plan view of a portion of the complete milking apparatus. Fig. 2 is an enlarged horizontal sectional view of the suction intermitter. Fig. 3 is a vertical section therethrough. Fig. 4 is an enlarged sectional view of the connection between the discharge pipe and can.

The complete milking apparatus—generally speaking—comprises a main suction pipe A which is connected to any suitable exhausting apparatus or pump B and is usually located in a room adjacent to that in which the cows are confined during the milking operation. To the pipe A are connected branch pipes C; the number of such branch pipes depending upon the maximum capacity of the apparatus or number of cows to be milked simultaneously. These pipes preferably extend directly through the wall W separating the milking room from the receiving room, and are provided with valves $c$ which can be closed when the branches are not in use or while adjusting the milking devices. To each of these branch pipes C can be detachably connected a flexible hose $d$ to which the teat-cups or milking devices D are attached.

The particular construction of the milking devices or teat-cups forms no part of the present invention and any preferred construction thereof adapted to be operated by suction can be used.

Customarily a vacuum of about 15 inches is maintained in the pipes A and C so that when the milking devices are applied to the cow's udder the milk will be withdrawn and directed through pipes C and A into cans E, which are preferably connected with pipe A intermediate the branches C and the pump B, by my novel connecting-device hereinafter explained.

The particular object of my invention is to produce an intermittent sucking action on the teats by alternately admitting air and exhausting it from the pipe $d$ of the milking devices by means of the novel suction intermitter preferably inserted in each pipe C between the pipe A and valve $c$; said suction intermitters being constructed alike, the description of one will explain all.

Within a section 1 of pipe C is placed a piston 2 and apertures $1^a$ and $1^b$ are made in section 1 near the opposite ends of the piston, said apertures connecting with the ends of a by-pass pipe 3 through which the milk passes around the piston. Near port $1^b$ is an air port $1^c$ normally closed by the piston. The piston is adapted to be reciprocated by means of a pitman $4^b$, connected with a pin $2^a$ attached to the piston and projecting through a slot $1^e$ in the side of section 1, the pitman $4^b$ being connected to a crank $4^a$ on the crank-shaft 4 as indicated in Fig. 1, which shaft may be operated by any suitable motor.

When the piston is fully moved to the right as indicated in Fig. 3, it closes port $1^a$ and uncovers an air port $1^c$ by which air is admitted to the flow into the pipe C and hose $d$ between the vacuum intermitter and the teat-cups. When the piston 2 moves to the left, it closes the air port $1^c$ and then uncovers port $1^a$ immediately reëstablishing a vacuum in the pipe D and the teat-cups, and the milk will then flow around the piston through the by-pass pipe 3 as indicated in Fig. 2.

By properly regulating the length and time of reciprocations of the piston and the positions of the ports $1^c$ and $1^a$ the desired intermittent suction can be obtained in the teat-cups while a constant suction is maintained in the pipe A; and thus a regular intermittent sucking action is obtained on the teats instead of a constant suction thereon—thus the effectiveness of the apparatus is greatly enhanced and there is less discomfort to the cow. Preferably I cover air port 1ᶜ with a cup 5 (provided with a perforated cap 5ᵃ) and adapted to contain cotton or other filtering material to prevent dust or contaminating matters entering the pipe C.

In order to save as many joints as possible I prefer to place the piston 2 directly within part of the pipe C and connect the by-pass pipe 3 direct to pipe C as indicated in the drawings; but obviously the suction intermitter could be separately formed and inserted in the length of pipe C.

In order to discharge milk from pipe A into ordinary cans or receptacles E, I insert in the said pipe at the proper points, see Fig. 4, delivery valves, the casings 6 of which are connected to the pipe A by means of detachable couplings 6ᵃ of any suitable construction. The casings 6 are provided with a depending cylinder 6ᵇ to the lower end of which is secured a cap 7 corresponding in form to the ordinary can cover, and adapted to be inserted like a can cover into the mouth of the can E see Fig. 4; and said cap is provided with a rubber gasket 7ᵃ adapted to form an air-tight joint between the cap 7 and the flange e around the mouth of the can. In the lower part of the cylinder 6ᵇ is closely fitted a slidable tube 8 which is upheld and retained in the cylinder by any suitable means, such as pins 8ᵃ extending through slots 6ᶜ in the side of the cylinder. Suspended from tube 8 by means of a cross pin 9ᶜ is a conical valve 9 which is adapted to open outwardly by gravity when the tube is in its lowest position (as shown in full lines in Fig. 4), and will allow the milk to enter the can, the milk being directed downward into the can by a deflecting rib 6ᵉ in the valve casing, as shown in Fig. 4, by which rib the milk is directed into the can and when the vacuum in the pipe rises the valve will close under the suction without the vacuum being broken.

When it is desired to remove a can E or substitute an empty can therefor, the valve 9 can be raised by lifting tube 8 by means of pins 8ᵃ to the position shown in dotted lines in Fig. 4. Valve 9 then closes the cylinder and being held closed when the cap is separated from the can by the suction in pipe A. When a can E is put in position the valve 9 can be opened by forcibly depressing tube 8 by means of pins 8ᵃ. With this device the milking operation does not have to be stopped in order to remove filled cans or connect empty ones to the suction pipe.

The suction intermitter and delivery valves can be cleansed by circulating water through them as easily as any other portions of the apparatus, and do not have to be taken down or taken apart for cleansing.

Having described my invention what I claim as new and desire to secure by Letters Patent is:

1. In a milking apparatus the combination of a main suction pipe, a milk pipe valve casing detachably connected to said pipes and having a cylindrical portion intermediate said pipes, a cap-plate connected to the lower end of said cylinder and provided with a gasket adapted to close the mouth of a can, and a deflector in said casing adapted to direct incoming milk downwardly into the can without stopping the vacuum, a tube slidably fitted in the cylinder and a valve suspended from said tube.

2. In a milking apparatus, the combination of a suction pipe having an air inlet, and means for creating a suction at one end of said pipe, and a reciprocatory piston adapted to open and close the air inlet; with a branch pipe having its ends connected to the suction pipe on opposite sides of said air inlet and forming a by-pass around the inlet, said piston being adapted to alternately open and close the by-pass, said air inlet being uncovered by said piston when the by-pass is closed, and said air inlet being located at the side of the piston remote from the suction means.

3. In a milking apparatus, the combination of a suction pipe having an air inlet intermediate its ends, means for creating a vacuum connected with one end of said pipe, and a milking device connected to the other end thereof; with a by-pass pipe having its ends connected to the suction pipe at opposite sides of said air inlet, and a reciprocating piston adapted to close and unclose the by-pass pipe and the air inlet, and to admit air into the portion of the suction pipe connecting with the teat-cups when the by-pass pipe is closed.

4. In a milking apparatus, the combination of a suction pipe having an air inlet, means for maintaining suction in said pipe, and a milking device connected with said pipe; with a suction intermitter comprising a by-pass pipe having its ends connected to the suction pipe at opposite sides of said air inlet, and a piston in said suction pipe adjacent the air inlet, said by-pass and air inlet being alternately opened and closed by said piston, and said air inlet being so located relative to the piston that when open air is admitted to that part of the suction pipe between the teat-cups and the piston, and means for reciprocating the piston.

5. In a milking apparatus, the combination of a suction pipe, and a milk pipe, with a valve casing connected to said pipes and having a depending cylinder intermediate its connections to said pipe, an adjustable valve in the lower part of the cylinder, and a curved deflector in the valve casing above the cylinder and intermediate the said pipes adapted to deflect the milk entering the casing from the milk pipe downwardly into the cylinder and manually operated means whereby the valve may be adjusted, substantially as described.

6. In a milking apparatus, the combination of a suction pipe, and a milk pipe, with a casing connected to said pipes and having a depending cylinder intermediate its connections to said pipe, a cap on the lower end of said cylinder adapted to fit the mouth of a milk can, an adjustable valve in the lower part of the cylinder, and a deflector in the casing intermediate the said pipes adapted to deflect the milk entering the casing downwardly into the cylinder, and manually operated means whereby the valve may be adjusted.

In testimony that I claim the foregoing as my own, I affix my signature in presence of two witnesses.

WILLIAM SINCLAIR.

Witnesses:
 THS. ANDERSEN,
 JOHN H. BOLTON.